United States Patent [19]
Cook et al.

[11] 3,782,509
[45] Jan. 1, 1974

[54] CALIPER RETAINING MEANS FOR A MOTOR VEHICLE DISC BRAKE

[75] Inventors: Harry E. Cook, Detroit; Francis L. Janosi, Dearborn Heights, both of Mich.

[73] Assignee: Ford Motor Company, Dearborn, Mich.

[22] Filed: July 2, 1971

[21] Appl. No.: 159,379

[52] U.S. Cl. .............................. 188/73.3, 188/73.5
[51] Int. Cl. .......................................... F16d 55/224
[58] Field of Search ................ 188/73.3, 73.5, 73.6, 188/72.4, 205 A

[56] References Cited
UNITED STATES PATENTS
3,612,226  10/1971  Pauwels et al. .................... 188/73.3
3,616,879  11/1971  Pauwels ............................. 188/73.3
3,625,314  12/1971  Rinker ............................... 188/73.3

FOREIGN PATENTS OR APPLICATIONS
1,207,328  9/1970  Great Britain ..................... 188/73.3

Primary Examiner—George E. A. Halvosa
Attorney—John R. Faulkner et al.

[57] ABSTRACT

A disc brake for a motor vehicle having an anchor plate secured to a wheel support member. A brake caliper is slidably supported on the anchor plate and straddles a brake rotor. The caliper is constructed to urge a pair of brake shoes into engagement with the braking surfaces of the brake rotor. A unique releasable retaining means secures the caliper to the anchor. In the presently preferred embodiment, the unique releasable retaining means comprises a leaf spring and a channel-shaped key.

17 Claims, 13 Drawing Figures

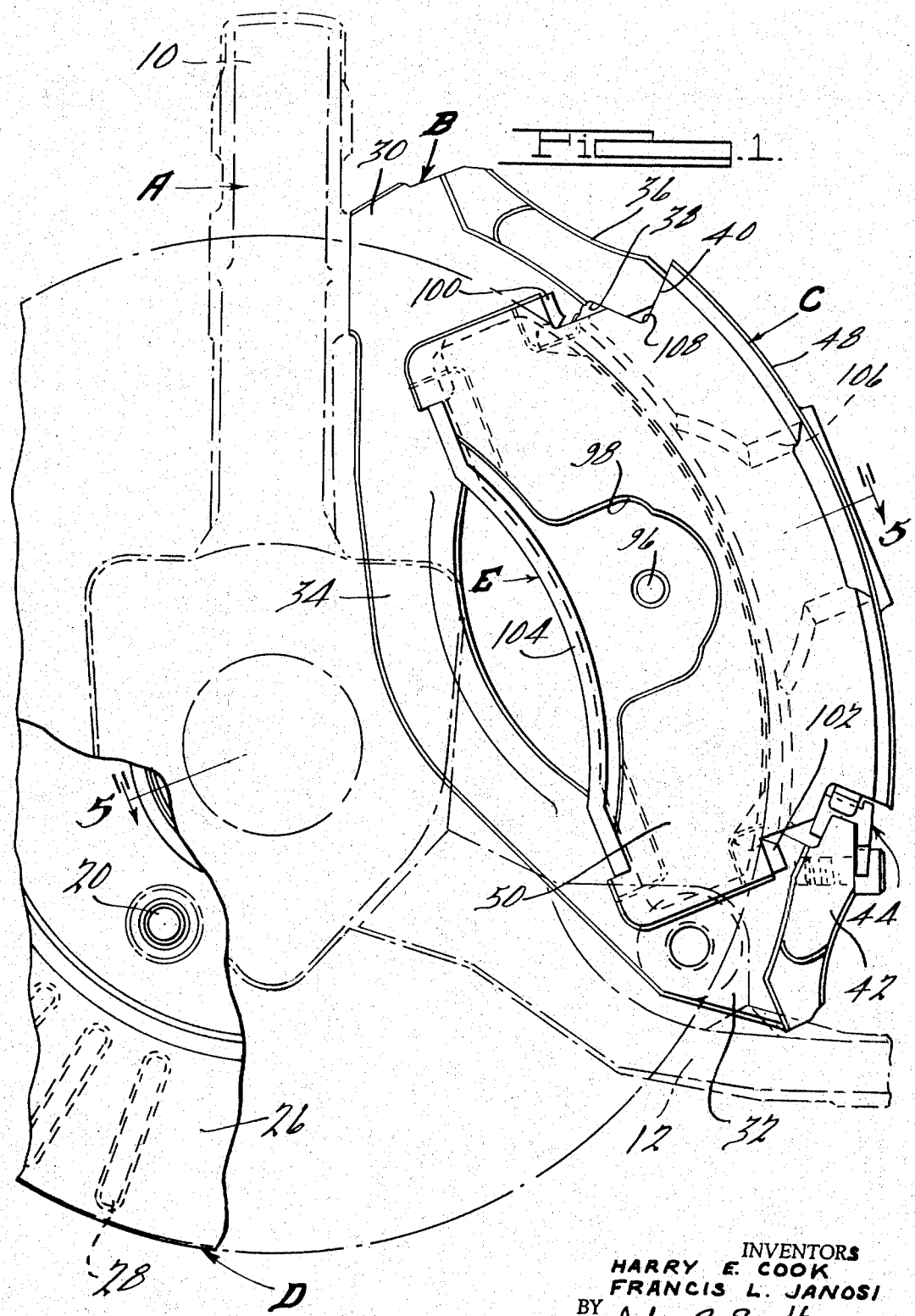

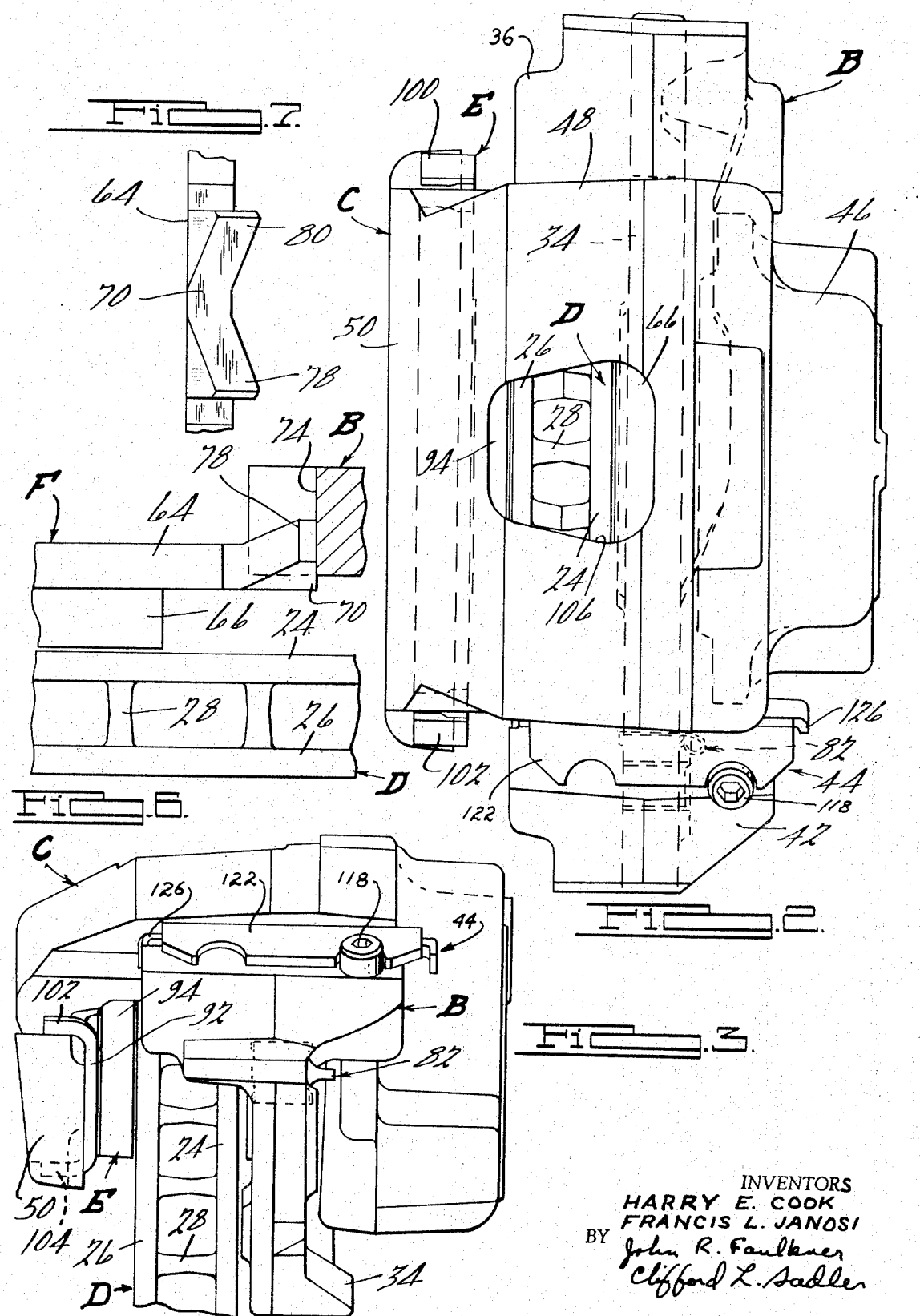

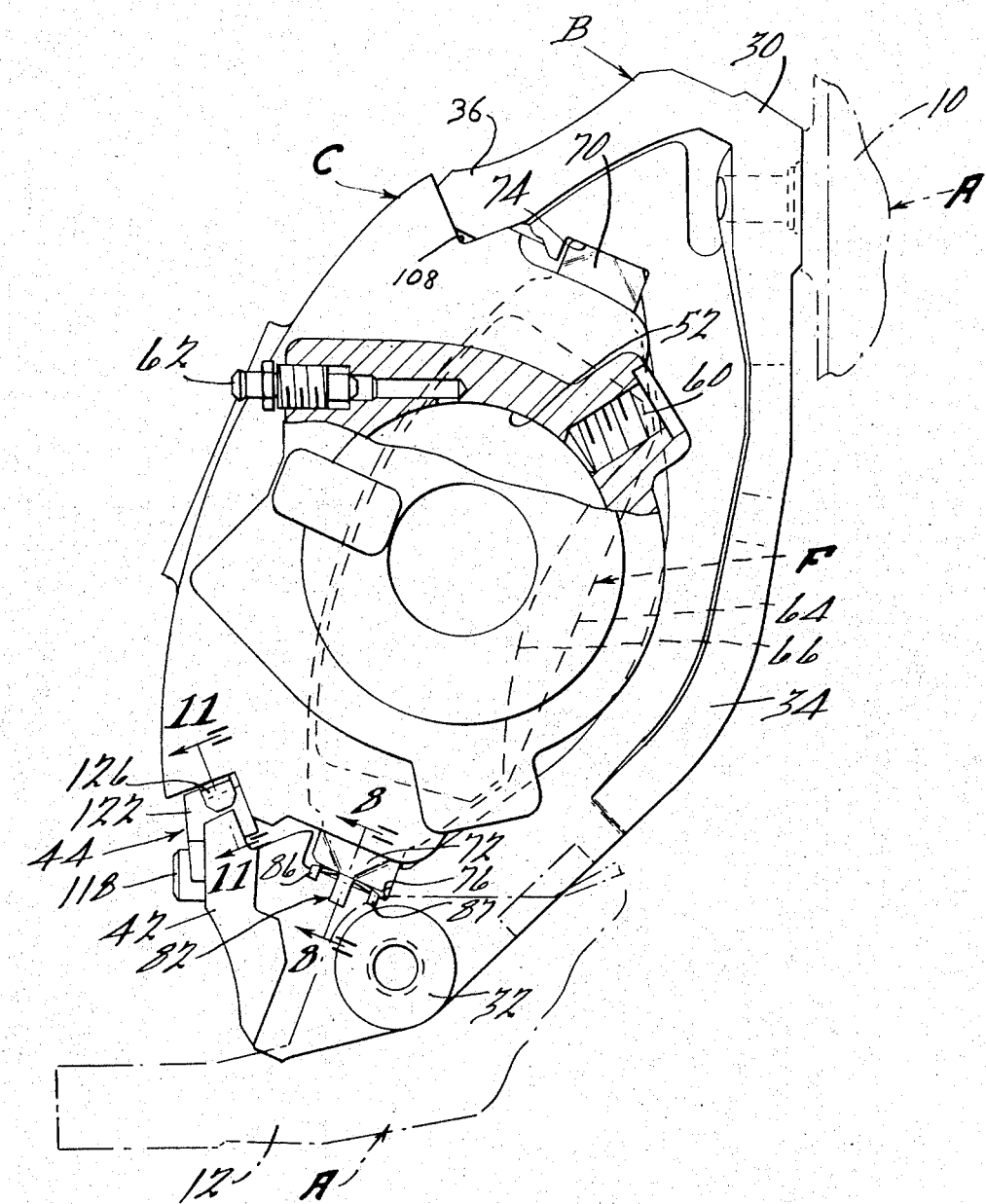

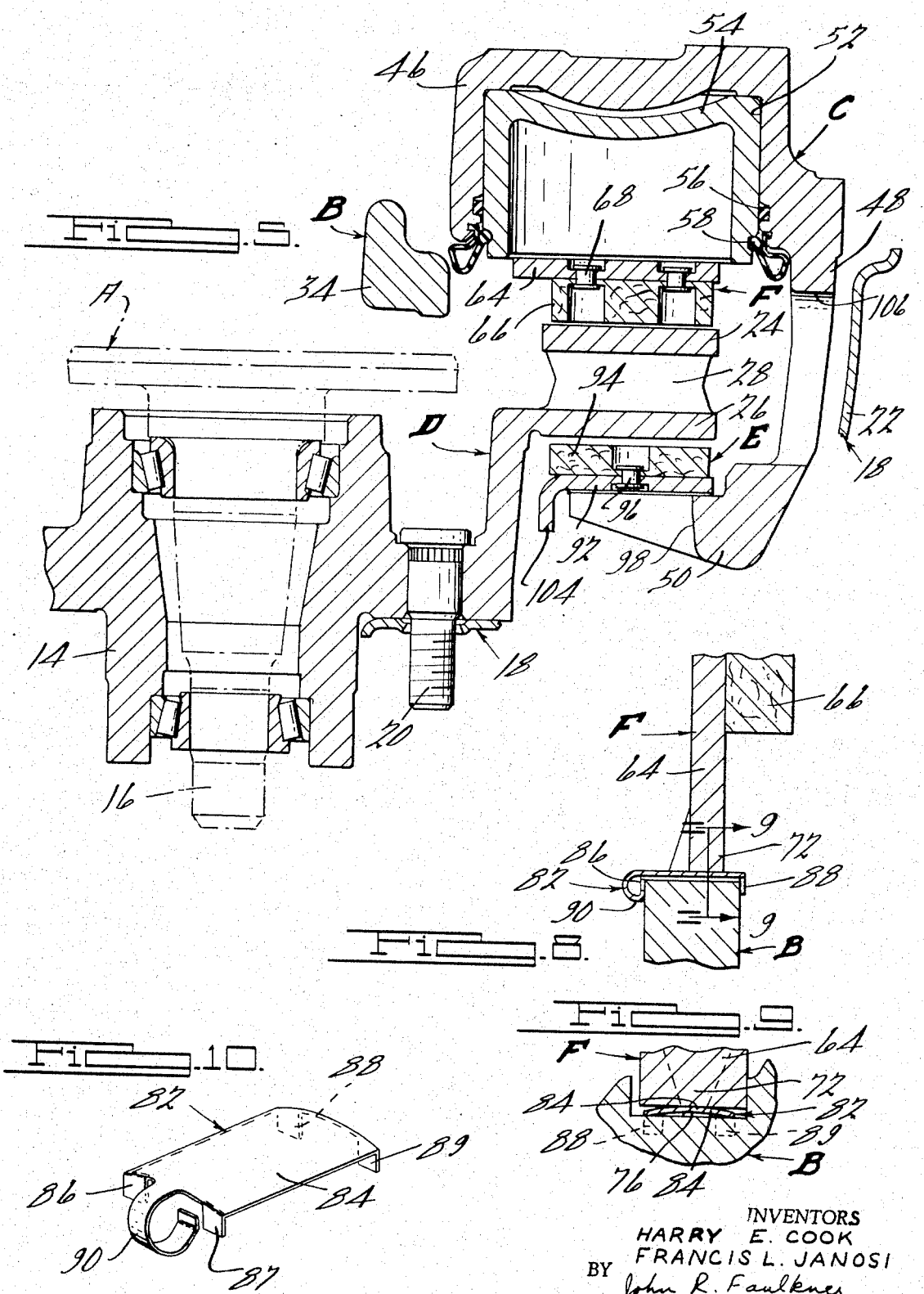

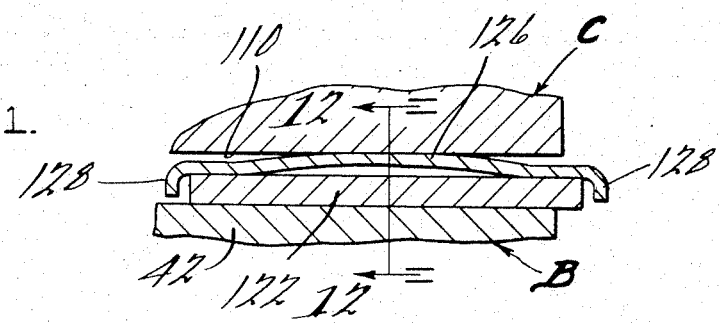
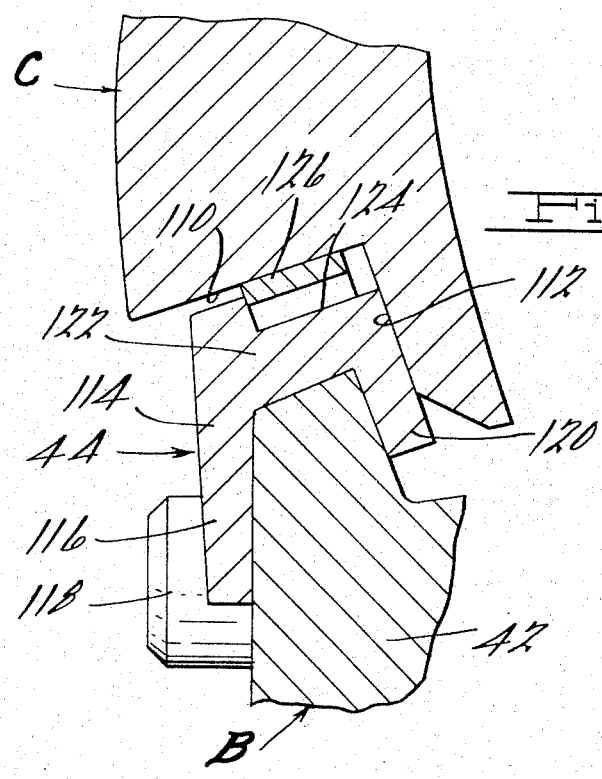
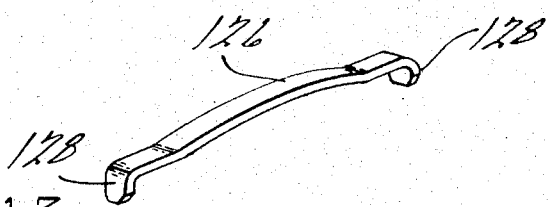

CALIPER RETAINING MEANS FOR A MOTOR VEHICLE DISC BRAKE

BACKGROUND OF THE INVENTION

The present invention relates to disc brakes for motor vehicles, and more particularly to disc brakes of the floating caliper type. The present invention is particularly concerned with means for securing the brake caliper to the anchor plate while permitting the caliper to slide parallel to the axis of rotation of the wheel during a brake application.

It is a principal object of the present invention to provide a retaining means that is of simple construction and reliable in operation. It is a further object to provide a retaining means that may be readily disassembled to permit the ready disengagement of the caliper from the anchor.

BRIEF SUMMARY OF THE DISCLOSURE

In the presently preferred embodiment of this invention, a wheel spindle of a motor vehicle front suspension rigidly supports a disc brake anchor or torque plate. In addition, the spindle rotatably supports a disc brake rotor. A brake caliper straddles the rotor and is in slidable engagement with the anchor plate. Brake shoes are provided on either side of the rotor which are constructed to be urged by the caliper into frictional engagement with the rotor.

The caliper has a pair of V-shaped grooves that extend parallel to the axis of rotation of the rotor. The anchor plate has a first pair of inclining surfaces that slidably engage the walls of one of the V-shaped grooves. A channel-shaped key is secured to another portion of the anchor plate and provides a second pair of surfaces that are in slidable engagement with the walls of the other V-shaped caliper groove.

A leaf spring is interposed between the key and one wall of the second V-shaped groove in the caliper. The leaf spring urges the first caliper V-shaped groove into engagement with the first pair of inclined surfaces of the anchor plate.

This disc brake construction permits the caliper to slide in a direction parallel to the axis of rotation of the brake rotor during a brake application. As it slides, the first of its V-shaped grooves is in engagement with the inclined surfaces of the anchor and the second V-shaped groove is in sliding engagement with the key and the leaf spring. In the preferred embodiment of the present invention, the outboard brake shoe is carried by the caliper and, therefore, brake torque is transmitted from the caliper to the anchor plate through the sliding surfaces. Which of the surfaces that carries the braking torque is determined by the direction of rotation of the brake rotor.

The brake caliper is removed from engagement with the anchor plate by first unscrewing a machine screw which holds the channel-shaped key to the anchor plate and then slidingly removing the key and leaf spring. The brake caliper is then free to swing radially outwardly away from engagement with the anchor plate. The caliper pivots about the engagement between the first of its V-shaped grooves and the first pair of inclined surfaces on the anchor plate until it is free of the anchor plate.

BRIEF DESCRIPTION OF THE DRAWINGS

The many objects and advantages of a disc brake constructed in accordance with the present invention will become apparent upon consideration of the following detailed description and the accompanying drawings, in which:

FIG. 1 is a side elevational view of a disc brake assembly emboding a presently preferred form of this invention;

FIG. 2 is a rear elevational view of the disc brake assembly of FIG. 1;

FIG. 3 is an end view of the disc brake assembly;

FIG. 4 is a side elevational view, partly in section, of the disc brake assembly viewed from the opposite side of FIG. 1;

FIG. 5 is a sectional view taken along section lines 5—5 of FIG. 1;

FIG. 6 is a plan view (slightly enlarged) showing the inboard brake shoe and lining assembly, brake rotor and the anchor plate of the disc brake assembly;

FIG. 7 is an end view (slightly enlarged) of the inboard brake shoe shown in FIG. 6;

FIG. 8 is a sectional view taken along section lines 8—8 of FIG. 4 showing an anti-rattle spring in position between one end of the inboard brake shoe and lining assembly and the anchor plate;

FIG. 9 is a sectional view taken along section lines 9—9 of FIG. 8;

FIG. 10 is a perspective view of the anti-rattle spring of FIGS. 8 and 9;

FIG. 11 is a sectional view taken along section lines 11—11 in FIG. 4 and showing the retaining key and leaf spring;

FIG. 12 is a sectional view taken along section lines 12—12 of FIG. 11; and

FIG. 13 is a perspective view of the leaf spring of FIGS. 11 and 12.

DETAILED DESCRIPTION OF THE PREFERRED EMBODIMENT

Referring now to the drawings for a detailed description of the presently preferred embodiment of this invention, FIG. 1 illustrates a disc brake assembly for the front wheel of a motor vehicle.

In FIG. 1, the assembly includes a wheel spindle A to which an anchor or torque plate B is rigidly secured. A floating brake caliper C is slidably supported on the anchor B. The caliper C straddles a brake rotor D that is rotatably supported on the spindle A. The brake assembly includes an outboard brake shoe and lining assembly E which is supported on the caliper C and an inboard brake shoe and lining assembly F which is supported on the anchor B. A hydraulic motor within the caliper C is constructed to draw the brake shoe and assemblies E and F together and clamp the brake rotor D therebetween. When the rotor D is clamped, braking torque is transmitted from the outboard shoe and lining assembly E through the caliper C to the anchor B. Braking torque exerted on the inboard shoe and lining assembly F is transmitted directly to the anchor B.

The wheel spindle A forms a part of an independent front suspension system for a motor vehicle and is constructed to be connected to upper and lower suspension arms. The spindle A includes an upwardly extending arm 10 which is designed to receive a ball joint assembly for connection with the upper suspension arm. The lower suspension arm connects to the spindle A at a point not shown in the drawings. The spindle A also includes a rearwardly extending steering arm 12 that is constructed to be connected to the steering linkage of the motor vehicle. The spindle A still further comprises a spindle shaft 16.

Referring to FIG. 5, the brake rotor D has a generally hat-shaped construction with a hub portion 14 that is rotatably supported on the shaft portion 16 of the spindle A by means of spaced roller bearings. A road wheel 18 is secured to the hub of the rotor D by means of circumferentially spaced bolts 20. The wheel 18 includes a rim portion 22 which is designed to support a pneumatic tire.

The rotor D includes inboard and outboard annular braking surfaces 24 and 26. The members which form the braking surfaces 24, 26 are separated by fins 28. The fins 28 are circumferentially spaced apart so as to provide radial passages between the braking surfaces 24, 26 for the flow of cooling air. Due to the spacing of the braking surfaces 24, 26 and the passages formed by the fins 28, the rotor D is of the type which is sometimes referred to as a ventilated rotor.

The anchor or torque plate B includes a first portion 30 that is bolted to the upright arm 10 and a second portion 32 that is bolted to the steering arm 12 of the spindle A. A bridging member 34 extends between the first and second anchor plate attaching portions 30 and 32. The anchor plate B includes a guide member 36 having a pair of guide surfaces 38 and 40. The guide surfaces 38, 40 are situated radially outwardly beyond the periphery of the rotor D and extend axially across its periphery. The surfaces 38, 40 support a portion of the caliper C. The anchor B also includes a guide support 42 situated adjacent the anchor attaching portion 32. The guide support 42 is situated radially outwardly of the rotor D and extends axially across its periphery. Guide support 42 supports a releasable retaining means 44 that engages the caliper C as will be described in greater detail later.

The brake caliper assembly C straddles the rotor D and is in slidable engagement with the anchor B. Referring to FIG. 5, the caliper C includes a casting having a hydraulic cylinder portion 46, a bridging portion 48 that spans the periphery of the rotor D and a reaction portion 50 situated adjacent the outboard braking surface 26 of rotor D.

The hydraulic cylinder portion 46 of the caliper C includes a cylinder bore 52 in which a piston 54 is slidably received. An annular seal 56 seals the clearance between the cylinder bore 52 and the piston 54. A flexible boot seal 58 is interposed between the cylinder body 46 and the piston 54 to protect the cylinder bore 52 from contamination.

As seen in FIG. 4, a port 60 passes through the body of the cylinder portion 46 and connects with the interior of the cylinder bore 52. Port 60 provides a means for connecting a hydraulic pressure source (such as a brake master cylinder) to the chamber situated between the end of the piston 54 and the end of the cylinder bore 52. Fitting 62 provides a means for bleeding air from the hydraulic chamber in a well-known manner for a well-known purpose.

The inboard brake shoe and lining assembly F includes a rigid metal brake shoe 64 to which a frictional brake lining 66 is secured by means of rivets 68. The brake lining 66 is generally smaller than the brake shoe 64. The inboard brake shoe 64 has extending end portions 70 and 72 that fit within generally rectangular guide grooves 74 and 76 provided in the anchor plate B. The rectangular grooves 74, 76 provide guide means for the displacement of the inboard brake shoe and lining assembly F in an axial direction toward the braking surface 24 of rotor D.

The inboard brake shoe and lining assembly F is interposed between the piston 54 and braking surface 24 of the rotor D with the piston arranged to engage the backside of the shoe 64. The lining 66 has a friction face that is constructed to engage the friction surface 24 of the rotor D.

As seen in FIGS. 6 and 7, the corners 78 and 80 of the end 70 of the inboard shoe 64 are each bent along a diagonal in a direction away from the lining 66 and away from the braking surface 24 of rotor D. In the end view (FIG. 7), the end surface of the shoe 64 has a V-shaped configuration. The V-shape produced by angling of the corners 78 and 80 provides an increased *effective* thickness to the bearing surface of the shoe end 70 which engages the depth of the groove 74 of anchor B.

An anti-rattle spring 82 is interposed between the other end 72 of the inboard brake shoe 74 and the depth of the guide groove 76 in the anchor B. The location of the anti-rattle spring 82 is shown in FIG. 4 and its construction is illustrated in greater detail in FIGS. 8, 9 and 10. The anti-rattle spring 82 has an arcuate body portion 84 with a generally rectangular shape in plan view. Tabs 86, 87, 88 and 89 are arranged generally perpendicular to the main body 84 of the spring 82 with one at each corner. The spring 82 is fitted into the groove 76 with the tabs 86, 87 situated on one side of the anchor plate B and the tabs 88, 89 positioned on the other side of the anchor plate B.

A circular spring element 90 is integrally formed of the spring 82 and has a curled over end that engages the anchor plate B adjacent the groove 76. The circular portion 90 exerts a spring force that draws the tabs 88, 89 into tight engagement with the anchor B.

The end 72 of the inboard brake shoe 64 has its corners bent along diagonal lines in the same fashion as the end 70 shown in FIGS. 6 and 7. The end 72 has an end surface of V-shaped configuration similar to that shown in FIG. 7 which bears against the body portion 84 of spring 82.

The arcuate body portion 84 of the anti-rattle spring 82 occupies the clearance space between the torque transmitting end 72 of the inboard brake shoe and lining assembly F and the depth of the groove 76. The spring 82 is constructed to accommodate any variation due to manufacturing tolerances in the dimension between the depths of the grooves 74 and 76 and the length of the inboard brake shoe 64 from end 70 to end 72. The anti-rattle spring 82 maintains a bias force on the brake shoe and lining assembly F and prevents it from chattering or rattling either when the disc brake is being applied or when the brake shoe assembly F is disengaged from the rotor D.

The outboard brake shoe and lining assembly E is secured to the reaction portion 50 of caliper C and comprises a stamped metal shoe 92 to which a brake lining 94 is affixed by means of a series of rivets 96.

The reaction portion 50 of the caliper C is bifurcated by a central recess 98. The outboard brake shoe 92 has edge portions that are turned or bent to form flanges which grip the bifurcated parts of the caliper reaction portion 50. The gripping flanges include bent over tabs 100 and 102 (FIGS. 1, 2 and 3) situated at the corners of the shoes 92. The lower edge of the outboard brake shoe 92 is provided with an extended flange 104. The ends of the flange 104 engage the bifurcated parts of the reaction portion 50 whereby the parts are trapped between the ends of flange 104 and the tabs 100 and 102. This flange arrangement secures the outboard brake shoe and lining assembly E to the caliper C.

The bridging portion 48 of the caliper C which spans the periphery of the rotor D and interconnects the cylinder portion 46 and reaction portions 50 is provided with a central opening 106. The opening 106 serves as a means for permitting the visual inspection of the linings 66 and 94 of the inboard and outboard brake shoe and lining assemblies F and E.

Means are provided in accordance with the present invention for slidably supporting and releasably securing the caliper C to the anchor plate B. One edge of the bridging portion 48 of caliper C is provided with a V-shaped axially extending groove 108. The angled surfaces which form the V-shaped groove 108 complement the inclined surfaces 38 and 40 of the guide member 36 of anchor plate B. In operation, the inclined surfaces of the V-shaped caliper groove 108 are in slidable engagement with inclined surfaces 38 and 40.

Similarly, angled surfaces 110 and 112 define a V-shaped groove at the opposite edge of the bridging portion of caliper C. The releasable retaining means 44 is interposed between the guide support 42 and the V-shaped groove formed by the angle surfaces 110, 112. The releasable retaining means 44 provides slidable supports for the caliper C and, in addition, a means for removing the caliper from engagement with the anchor B.

The releasable retaining means 44 includes a key 114 having a generally channel-shaped construction that extends axially across the periphery of the rotor D and is supported by the guide support 42 of the anchor plate B. The key 114 includes an outer flange 116 which rests against the exterior surface of the guide support 42 and is provided with at least one notch on the edge of the flange 116. A machine screw 118 is secured in a threaded hole in the guide support 42 and engages one of the notches in the key flange 116. This interrelationship prevents the axial displacement of the key.

The key 114 includes a second flange 120 positioned adjacent the lower surface of the guide support 42. The lower flange 120, in addition to being positioned adjacent the guide support 42, has its exterior surface in slidable engagement with the surface 112 of the caliper groove. The central portion 122 of the key 114 is formed with an axially extending groove 124 in which a leaf spring 126 is positioned. The spring 126 has a central bowed portion that engages the surface 110 of the caliper groove and flat axially extending end portons which engage the groove 120 of the key 114. The ends 128 of the spring 126 are bent at an angle to form locating tabs.

The channel-shaped key 122 is located with respect to the guide support 42 by the machine screw 118. The leaf spring 126 is secured and located in position by the bent ends 128 which prevents its axial displacement. As indicated in FIG. 11, the leaf spring 126 is of sufficient length so as to span the key 122 with its bent ends 128 positioned adjacent the ends of the key 122. The leaf spring 126 is constructed to exert a spring force tending to move the caliper C in a direction away from guide support 42 and into engagement with the inclined surfaces 38, 40 of the guide member 36 of anchor B.

OPERATIONS

The disc brake assembly is shown in the drawings in association with the left front wheel of an automobile. The brake rotor D rotates in a counterclockwise direction as seen in FIG. 1 during forward movement of the vehicle. During a brake application, pressure fluid is admitted through the port 60 into the chamber between the piston 54 and the depth of the bore 52. Pressure fluid in this chamber causes the piston 54 to move toward the brake rotor D (see FIG. 5). This action forces the inboard brake shoe and lining assembly F to move into engagement with the annular friction surface 24 of the rotor D. The inboard brake shoe and lining assembly F is guided in its movement toward the rotor D by its ends 72 and 74 which slide in the anchor plate grooves 70 and 72.

The bridge portion 48 of caliper C is in slidable engagement with the guide member 36 of anchor B and the releasable retaining means 44 connected to guide support 42. When the pressure chamber of cylinder 52 is pressurized with hydraulic fluid, the piston 54 and inboard brake shoe and lining assembly F move toward the rotor 20. The body of caliper C is drawn in the opposite direction by the pressurization of the chamber. This causes the reaction portion 50 to draw the outboard brake shoe and lining assembly F into engagement with the annular friction face 26 of rotor D. Thus, when the chamber of cylinder bore 52 is pressurized with hydraulic fluid, the caliper C is activated to cause the inboard and outboard brake shoe and lining assemblies F and E to trap the rotor D.

When the linings 66 and 94 engage the rotor D. thwy will tend to shift laterally in the direction of rotor rotation. Rotation of the inboard brake shoe and lining assembly F will be resisted and prevented by the engagement of the leading end 70 of the shoe 64 with the depth of the groove 74 in anchor B. The outboard brake shoe and lining assembly F is secured to the caliper casting C so that when it is drawn into engagement with the rotor D, braking torque will be transmitted through the caliper C to the guide member 36.

When the vehicle having the disc brake of FIG. 1 is moving in reverse, the rotor D will be turning in a clockwise direction. A brake application under these circumstances will cause the inboard brake shoe lining assembly F to transmit braking torque through the normally trailing end 72 through the anti-rattle spring 82 to the anchor plate groove 76 (FIGS. 8 and 9). Braking torque for the outboard shoe and lining assembly E will be transmitted through the caliper C and the releasable retaining means 44 to the guide support 42.

It will be noted from FIGS. 6 and 7 that the corners 78 and 80 of the leading end 70 of inboard brake shoe 64 are angularly bent whereby the effective thickness of the shoe 64 is increased. This unique construction acts to stabilize the support for the brake shoe 64. In addition, it increases the effective thickness of the brake shoe so that when the lining 66 becomes worn, the corner portions of the end face of the leading end 70 will remain in engagement with the depth of the groove 74 (see FIG. 6). The trailing end 72 (see FIGS. 8 and 9) is similarly constructed with bent corners which provide a V-shaped end face in engagement with the anti-rattle spring 82.

The condition of the linings 66 and 94 can be determine by visual observation through the hole 106 in the bridge portion 48 of caliper C. If it is determined that the linings are worn and need to be replaced, the caliper C may be removed from engagement with the anchor B by removal of the releasable retaining means 44. This is done by withdrawing the threaded machine screw 18 which permits the key 122 and leaf spring 126 to be displaced in an axial direction until these two elements are removed from engagement with the caliper C and anchor B. A gap then exists between the guide support 42 and the inclined surfaces 110, 112. To remove the caliper C, it is merely necessary to swing it in pivotal fashion about the contact between the groove 108 and the inclined surfaces 38 and 40. The channel-shaped key 114 is designed to have a base portion 122 of sufficient thickness so that when it is removed, a big enough gap will be provided to permit the edge of surface 112 (FIG. 12) to clear the end of the guide support 42 as it is swung radially outwardly.

Once the caliper C is removed from engagement with the anchor B, the outboard brake shoe and lining assembly F may be forcibly removed from the reaction portion 50 of the caliper C for replacement purposes. With the caliper C out of the way, the inboard brake shoe and lining assembly F may be removed in an axial direction from its connection with the grooves 74, 76 of anchor B for replacement purposes.

In accordance with a slightly alternate procedure for disassembly the brake, the key 114 and leaf spring 126 are first removed. The caliper C is then shifted circumferentially to close the gap left by the removed key 114 and spring 126 whereby the caliper guide support 42 is placed in nested engagement with the V-shaped groove formed by inclined surfaces 110 and 112. The caliper C is then free to pivot about its engagement with guide support 42 in an outward direction. The edges of the groove 108 will clear the guide member 36 of anchor B.

It is to be noted that the minimum distance between the guide member 36 and guide support 42 is less than the maximum width of the bridging portion 48 of caliper C so that the guide member 36 must be nested in the groove 108 or the guide support 42 nested in the groove of surfaces 110, 112 in order to permit the radial removal of the caliper C after the key 114 and spring 126 are removed.

SUMMARY

In accordance with the presently preferred embodiment of this invention, a unique disc brake assembly is provided having a simplified caliper retaining means which permits the caliper to be pivotally displaced in a radial direction from its engagement with the anchor for servicing the inboard and outboard brake shoe and lining assemblies.

The foregoing description presents the preferred embodiment of this invention. Modifications and alterations may occur to those skilled in the art which will come within the scope and spirit of the following claims.

We claim:

1. A disc brake for a motor vehicle having a stationary anchor, a rotatable rotor, a pair of brake shoe and lining assemblies disposed adjacent said rotor, a housing straddling said rotor and connected to said anchor, said housing having means constructed to urge said brake shoe and lining assemblies into frictional engagement with the sides of said rotor, said anchor having circumferentially spaced apart integral nonresilient first and second support portions, said housing having a first housing portion directly engaging said first support portion, said housing having a second housing portion circumferentially spaced from said second support portion, the minimum distance between said first and second support portions being less than the maximum width of said housing between said first housing portion and said second housing portion, releasable retaining means interposed between said second support portion and said second housing portion, said releasable retaining means in combination with the direct engagement between said first portions being constructed to provide the sole means preventing displacement of said housing radially inwardly and radially outwardly, said releasable retaining means comprising only one key and only one spring, said key having a generally channel shape and engaging one of said second portions, means constructed to restrain said key against axial displacement relative to said one second portion, said key slidably engaging the other of said second portions, said spring being interposed between said key and said housing, said housing and said anchor being constructed so that when said releasable retaining means is removed from its interposed position a gap of sufficient size is provided between said second support portion and said second housing portion whereby said housing may be displaced radially outwardly away from said anchor.

2. A disc brake for a motor vehicle having a stationary anchor, a rotatable rotor, a floating caliper straddling said rotor and slidably engaging said anchor, a first brake shoe and lining assembly slidably supported by said anchor and disposed adjacent one side of said rotor, a second brake shoe and lining assembly secured to said caliper and disposed adjacent the other side of said rotor, said caliper having a hydraulic motor situated on one side of said rotor and constructed to move both of said assemblies into engagement with said rotor, said anchor having an integral nonresilient guide member situated radially outwardly of the periphery of said rotor and extending in an axial direction, said caliper having a portion directly slidably engaging said guide member, said anchor having an integral guide support circumferentially spaced from said guide member, releasable retaining means interposed between said guide support and said caliper, said releasable retaining means in combination with the direct engagement between said integral guide member and said caliper being constructed to provide the sole means preventing the displacement of said caliper radially inwardly and radially outwardly, said releasable retaining means comprising only one key and only one spring, said key comprising a rigid key engaging said guide support, means constructed to restrain said key against axial displacement relative to said guide support, said key slidably engaging said caliper, said spring being operatively interposed between said key and said caliper and constructed to exert a spring force tending to separate said key and said caliper, said anchor and said caliper being constructed so that when said releasable retaining means is removed from its interposed position a gap of sufficient size is provided between said guide support and said caliper whereby said caliper may be pivoted about said guide member and displaced radially outwardly away from said anchor.

3. A disc brake for a motor vehicle having a stationary anchor, a rotatable rotor, a pair of brake shoe and lining assemblies disposed adjacent said rotor, a floating caliper straddling said rotor and connected to said anchor, said caliper having means constructed to urge said brake shoe and lining assemblies into frictional engagement with the sides of said rotor, said anchor having circumferentially spaced apart integral nonresilient first and second support portions, said caliper having a first caliper portion directly slidably engaging said first support portion, said caliper having a second caliper portion circumferentially spaced from said second support portion, the minimum distance between said first and second support portions of said anchor being less than the maximum width of said caliper between said first caliper portion and said second caliper portion, releasable retaining means interposed between said second support portion and said second caliper portion, said releasable retaining means in combination with the direct engagement between said first portions being constructed to provide the sole means preventing displacement of said caliper radially inwardly and radially outwardly, said releasable retaining means comprising only one key and only one spring, means constructed to secure said key against axial displacement relative to one of said second portions, said key slidably engaging the other of said second portions, said spring being interposed between said key and said caliper and constructed to exert a spring force tending to separate said key and caliper, said anchor and said caliper being constructed so that when said releasable retaining means is removed from its interposed position a gap of sufficient size is provided between said second support portion and said second caliper portion whereby said caliper may be displaced radially outwardly away from said anchor.

4. A disc brake for a motor vehicle having a stationary anchor, a rotatable rotor, a floating caliper straddling said rotor and slidably engaging said anchor, said anchor having an integral nonresilient guide member situated radially outwardly of the periphery of said rotor and extending in an axial direction, said caliper having a portion directly slidably engaging said guide member, said anchor having an integral guide support circumferentially spaced from said guide member, releasable retaining means interposed between said guide support and said caliper, said releasable retaining means in combination with the direct engagement between said integral guide member and said caliper being constructed to provide the sole means preventing the displacement of said caliper radially inwardly and radially outwardly, said releasable retaining means comprising only one rigid key and only one spring, said key engaging said guide support said spring being interposed between said key and said caliper, said caliper having a first pair of surfaces slidably engaging said guide member, said caliper having a second pair of surfaces, one of said surfaces of said second pair engaging said key and the other of said surfaces of said second pair engaging said spring, said anchor and said caliper being constructed so that when said releasable retaining means is removed from its interposed position a gap of sufficient size is provided between said guide support and said caliper whereby said caliper may be displaced radially away from said anchor.

5. A disc brake for a motor vehicle according to claim 4 and including:
a first brake shoe and lining assembly slidably supported by said anchor and disposed adjacent one side of said rotor, a second brake shoe and lining assembly secured to said caliper and disposed adjacent the other side of said rotor, said caliper having a hydraulic motor situated on one side of said rotor and constructed to move both of said assemblies into engagement with said rotor.

6. A disc brake for a motor vehicle having a stationary anchor, a rotatable rotor, a floating caliper straddling said rotor and slidably engaging said anchor, said anchor having an integral nonresilient guide member situated radially outwardly of the periphery of said rotor and extending in an axial direction, said caliper having a portion directly slidably engaging said guide member, said anchor having an integral guide support circumferentially spaced from said guide member, releasable retaining means interposed between said guide support and said caliper, said releasable retaining means in combination with the direct engagement between said integral guide member and said caliper being constructed to provide the sole means preventing the displacement of said caliper radially inwardly and radially outwardly, said releasable retaining means comprising only one key and only one spring, said key comprising a rigid key slidably engaging said caliper and engaging said guide support, means constructed to restrain said key against axial displacement relative to said guide support, said spring being interposed between said key and said caliper, said spring exerting a spring force tending to separate said key and said caliper, said anchor and said caliper being constructed so that when said releasable retaining means is removed from its interposed position a gap of sufficient size is provided between said guide support and said caliper whereby said caliper may be displaced radially outwardly away from said anchor.

7. A disc brake for a motor vehicle according to claim 6 and including:
said spring comprising a leaf spring interposed between said key and said caliper.

8. A disc brake for a motor vehicle having a stationary anchor, a rotatable rotor, a pair of brake shoe and lining assemblies disposed adjacent said rotor, a housing straddling said rotor and connected to said anchor, said housing having means constructed to urge said brake shoe and lining assemblies into frictional engagement with the sides of said rotor, said anchor having circumferentially spaced apart integral nonresilient first and second support portions, said housing having a first housing portion directly engaging said first support portion, said housing having a second housing portion spaced from said first housing portion, releasable retaining means interposed between said second support portion and said second housing portion, said releasable retaining means in combination with the direct engagement between said first portions being constructed to provide the sole means preventing displacement of said housing radially inwardly and radially outwardly relative to said anchor, said releasable retaining means comprising only one rigid key and only one spring, said key being secured against axial displacement relative to one of said second portions and slidably engaging the other of said second portions, said spring being interposed between said key and said housing, said spring being constructed to exert a spring force urging said first housing portion into direct engagement with said second support portion, said housing and said anchor being constructed so that when said releasable retaining means is removed from its interposed position a gap of sufficient size is provided between said second support portion and said second housing portion whereby said housing may be displaced radially outwardly away from said anchor.

9. A disc brake for a motor vehicle according to claim 8 and including:
said spring including a leaf spring interposed between said key and said housing.

10. A disc brake for a motor vehicle having a stationary anchor, a rotatable rotor, a pair of brake shoe and lining assemblies disposed adjacent said rotor, a housing straddling said rotor and connected to said anchor, said housing having means constructed to urge said brake shoe and lining assemblies into frictional engagement with the sides of said rotor, said anchor having circumferentially spaced apart integral nonresilient first and second support portions, said housing having a first housing portion directly engaging said first support portion, said housing having a second housing portion circumferentially spaced from said second support portion, releasable retaining means interposed between said second support portion and said second housing portion, said releasable retaining means in combination with the direct engagement between said first portions being constructed to provide the sole means preventing the radial displacement of said housing relative to said anchor, said releasable retaining means being secured against axial displacement relative to one of said second portions and slidably engaging the other of said second portions, said releasable retaining means comprising a channel-shaped key engaging both said second portions said housing and said anchor being constructed so that when said releasable retaining means is removed from its interposed position a gap of sufficient size is provided between said second support portion and said second housing portion whereby said housing may be displaced radially outwardly away from said anchor, said releasable retaining means including spring means interposed between said key and said other second portion and constructed to exert a spring force tending to separate said key and said other second portion.

11. A disc brake for a motor vehicle according to claim 10 and including:
said spring means including a leaf spring interposed between said key and said other second portion.

12. A disc brake for a motor vehicle according to claim 10 and including:
said spring means including a spring constructed to exert a circumferentially directed spring force upon said housing to urge said first housing portion in a circumferential direction into direct engagement with said first support portion.

13. A disc brake for a motor vehicle having a stationary anchor, a rotatable rotor, a pair of brake shoe and lining assemblies disposed adjacent said rotor, a floating caliper straddling said rotor and connected to said anchor, said caliper having means constructed to urge said brake shoe and lining assemblies into frictional engagement with the sides of said rotor, said anchor having circumferentially spaced apart integral nonresilient first and second support portions, said caliper having a first caliper portion directly slidably engaging said first support portion, said caliper having a second caliper portion spaced from said first caliper portion, releasable retaining means spaced apart from said first portions and interposed between said second support portion and said second caliper portion, said releasable retaining means in combination with the direct engagement between said first portions being constructed to provide the sole means preventing radial displacement of said caliper relative to said anchor, said releasable retaining means being secured against axial displacement relative to one of said second portions and slidably engaging the other of said second portions, said releasable retaining means comprising a channel-shaped key engaging both said second portions, said caliper and said anchor being dimensioned so that when said releasable retaining means is removed from its interposed position a gap of sufficient size is provided between said second portions whereby said caliper may be displaced radially outwardly away from said anchor, said releasable retaining means including a spring means interposed between said key and said caliper, said spring means being constructed to exert a spring force tending to separate said key and said caliper.

14. A disc brake for a motor vehicle according to claim 13 and including:
said spring means being further constructed to urge said caliper into engagement with said first support portion.

15. A disc brake for a motor vehicle according to claim 13 and including:
said spring means including a leaf sring.

16. A disc brake for a motor vehicle according to claim 13 and including:
said second caliper portion being circumferentially spaced from said second support portion, the minimum distance between said first and second support portions being less than the maximum width of said caliper between said first caliper portion and said second caliper portion.

17. A disc brake for a motor vehicle according to claim 13 and including:
the minimum distance between said first and second support portions being less than the maximum width of said caliper between said first caliper portion and said second caliper portion.

* * * * *